United States Patent
Kim et al.

(10) Patent No.: US 11,945,477 B2
(45) Date of Patent: Apr. 2, 2024

(54) ELECTRIC DUAL-MODE WIPER SYSTEM FOR RAILWAY VEHICLES

(71) Applicant: KOREA RAILROAD RESEARCH INSTITUTE, Uiwang-si (KR)

(72) Inventors: Yeon Su Kim, Anyang-si (KR); Sung Hyuk Park, Anyang-si (KR)

(73) Assignee: KOREA RAILROAD RESEARCH INSTITUTE, Uiwang-si (KR)

( * ) Notice: Subject to any disclaimer, the term of this patent is extended or adjusted under 35 U.S.C. 154(b) by 661 days.

(21) Appl. No.: 17/093,979

(22) Filed: Nov. 10, 2020

(65) Prior Publication Data

US 2021/0387657 A1     Dec. 16, 2021

Related U.S. Application Data

(63) Continuation of application No. PCT/KR2020/007493, filed on Jun. 10, 2020.

(51) Int. Cl.
B61L 15/00 (2006.01)

(52) U.S. Cl.
CPC ............... B61L 15/0058 (2024.01)

(58) Field of Classification Search
CPC ..... B60S 1/08; B60S 1/48; B60S 1/50; B61D 25/00; B61L 3/006
See application file for complete search history.

(56) References Cited

U.S. PATENT DOCUMENTS

| 2005/0007054 A1* | 1/2005 | Kim ................ B60S 1/0818 |
| | | 318/483 |
| 2019/0061696 A1* | 2/2019 | Vadgaonkar .......... B60S 1/0807 |

FOREIGN PATENT DOCUMENTS

| CN | 102616209 | 8/2012 |
| JP | H07051408 | 11/1995 |
| KR | 101527683 | 6/2015 |
| KR | 102096987 | 4/2020 |
| KR | 102096994 | 4/2020 |
| WO | 9829285 | 7/1998 |

OTHER PUBLICATIONS

European Search Report—European Application No. 20804418.0 dated Feb. 14, 2023, citing KR 10-2096994, KR 10-2096987, and WO 98/29285.
International Search Report—PCT/KR2020/007493 dated Feb. 24, 2021.

* cited by examiner

*Primary Examiner* — Said Bouziane
(74) *Attorney, Agent, or Firm* — CANTOR COLBURN LLP

(57) ABSTRACT

Provided is an electric dual-mode wiper system for a railway vehicle. The electric dual-mode wiper system for a railway vehicle includes a first wiper drive unit and a second wiper drive unit, and controls a synchronization operation of the first wiper drive unit and a second wiper drive unit.

13 Claims, 6 Drawing Sheets

ELECTRIC DUAL-MODE WIPER SYSTEM FOR RAILWAY VEHICLES

BACKGROUND

1. Technical Field

The present disclosure relates to an electric dual-mode wiper system for a railway vehicle

2. Related Art

Wipers provided in various vehicles including railway vehicles are installed on the front glass window of a vehicle to secure a driver's view when it rains. In particular, the wipers provided in the railway vehicle need to be used not only when it rains but also when removing foreign matter adhering to the front glass window of the railway vehicle.

For example, in a case of a railway vehicle used for the subway, when a vehicle travels through an underground section, many fine particles of dust floating in an underground passage adhere to the front glass window of the vehicle to make the front glass window dirty such that a driver can hardly look ahead through the front glass window, and wipers are used to remove the foreign matter adhering to the front glass window.

In general, a railway vehicle is provided with only a single wiper or two wipers coupled to a linkage structure, which are designed to be driven in a form having the same movement by a single drive motor.

However, when two or more windows arranged in a driving portion of a railway vehicle are separated from each other, a single wiper cannot be combined, and when two wipers are driven equally by using one drive motor, the two wipers have different loads due to a difference in window shape, wind pressure, and precipitation, and thus, there is a problem in that it is difficult to appropriately respond to situations requiring different powers for each wiper.

In addition, in the wiper system of related art, when foreign matter such as birds and insects adheres to the wiper, a wiper motor and the wiper are overloaded, resulting in deformation of the wiper and a failure of the wiper motor. Furthermore, when the wiper is deformed due to an overload, there is a problem that wiper can seriously damage the front glass window of a railway vehicle.

3. Prior Art

An example of related art is Korean Patent Registration No. 10-1527683 (Title of Invention: Railway Emergency Wiper System).

SUMMARY

The present application is to solve the problems of the related art described above, and an object of the present application is to provide an electric dual-mode wiper system in which wipers are independently driven by different drive motors and operation stability is increased by an encoder or a proximity sensor that detects a rotational state of a wiper.

Another object of the present application is to provide an electric dual-mode wiper system for a railway vehicle that detects in real time whether or not an overcurrent is generated in a drive motor to remove foreign matter on a wiper by rotating the drive motor not only in the forward direction but also in the reverse direction, returns the wiper to an initial position, and rotates the drive motor in the forward direction again, thereby preventing an overload from occurring.

The objects to be achieved by the present embodiments are not limited to the above-described objects, and there may be other objects.

According to an embodiment, an electric dual-mode wiper system for a railway vehicle includes a first wiper drive unit that includes a first wiper, a first drive motor for driving the first wiper, a first linkage structure for connecting the first drive motor to the first wiper, and a first encoder for sensing an operation state of the first linkage structure; a second wiper drive unit that includes a second wiper arranged to be spaced apart from the first wiper, a second drive motor for driving the second wiper, a second linkage structure for connecting the second drive motor to the second wiper, and a second encoder for sensing an operation state of the second linkage structure; a first current measurement unit that measures a current of the first drive motor in real time; a second current measurement unit that measures a current of the second drive motor in real time; and a wiper control device that controls a synchronization operation of the first drive motor and the second drive motor based on information on the operation states of the first linkage structure and the second linkage structure transmitted from the first encoder and the second encoder. The wiper control device switches a rotation direction of the first drive motor to an opposite direction and moves the first wiper to an initial position thereof when a current value of the first drive motor measured by the first current measurement unit is greater than or equal to a threshold value, and switches a rotation direction of the second drive motor to an opposite direction and moves the second wiper to an initial position thereof when a current value of the second drive motor measured by the second current measurement unit is greater than or equal to a threshold value.

According to the present application, there is an effect in that two wipers are driven by different drive motors, and thus, it is possible to minimize risks of accidents, and wiper drive units are each provided with an encoder and a proximity sensor that senses a rotational state of the wiper to control the two wipers to rotate at the same rotation angle, and thus, it is possible for a driver to stably operate a railway vehicle without driver's feeling anxiety.

There is also an effect in that whether or not an overcurrent is generated in a drive motor is detected in real time to remove foreign matter on a wiper by rotating a drive motor not only in the forward direction but also in the reverse direction, the wiper returns to an initial position, and the drive motor rotates in the forward direction again, and thus, an overload may be prevented from occurring, resulting in an increase in operation stability of the wiper.

DETAILED DESCRIPTION OF THE EMBODIMENTS

Figure 1:
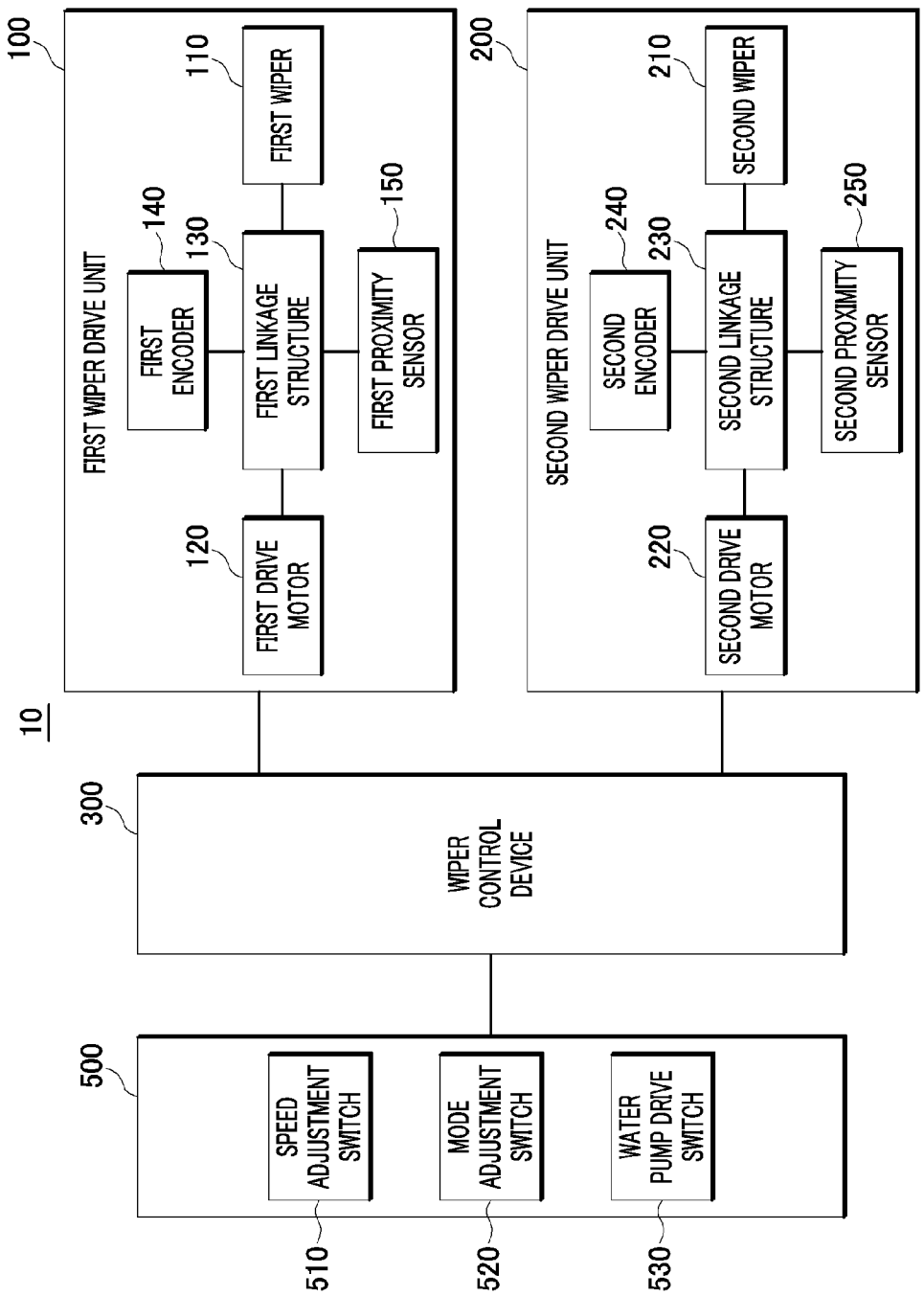
FIG. 1 is a diagram illustrating a wiper system for a railway vehicle according to an embodiment of the present disclosure.

Hereinafter, examples of the present application will be described in detail with reference to the accompanying drawings so that those skilled in the art may easily implement the present application. However, the present application may be embodied in many different forms and is not limited to the examples demonstrated here. In the drawings, portions irrelevant to the description are omitted to clearly describe the present application, and like reference numerals designate like portions throughout the specification.

In the present specification, when a portion is "connected" to another portion, it includes not only "directly connected", but also "electrically connected" with another element interposed therebetween.

Throughout the present specification, when a member is located "on" another member, this includes not only a case in which one member is in contact with another member but also a case in which further another member exists between the two members.

In the present specification, when a portion "includes" a certain configuration element, it means that it further includes other configuration elements, without excluding the other configuration elements unless otherwise stated. The terms "about", "substantially", and the like as used throughout the present specification are used at, or in proximity to, the numerical values when manufacturing and material tolerances inherent in the meanings mentioned are given, and in order to prevent unscrupulous infringers from unfair use, accurate or absolute figures are used to aid the understanding of the present specification. As used throughout the present specification, a term "step" or "step of" does not mean "step for".

Hereinafter, an embodiment of the present disclosure will be described in detail with reference to the drawings.

Figure 2:
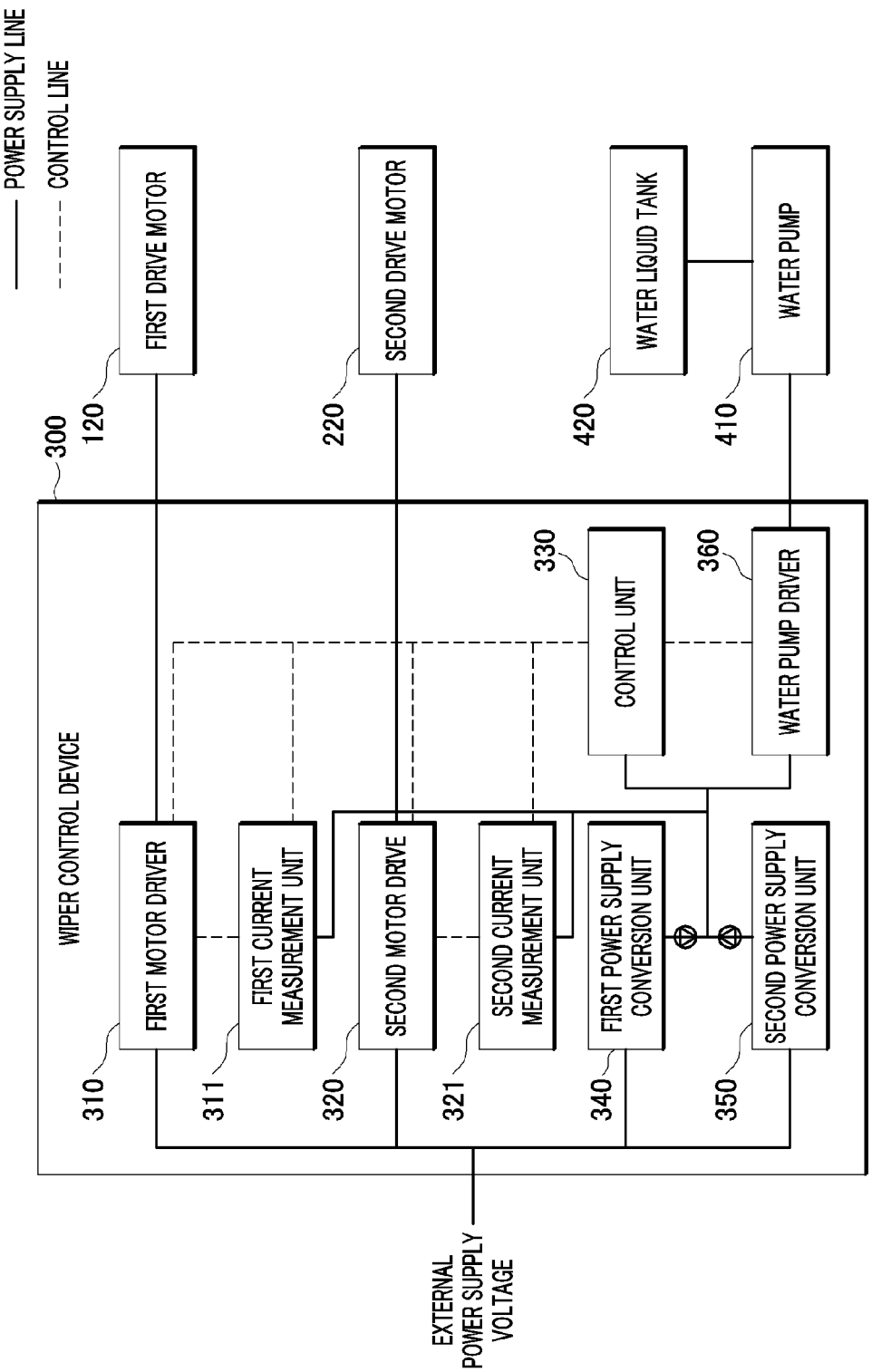
FIG. 2 is a diagram illustrating a wiper control device according to an embodiment of the present disclosure.
Figure 3A:
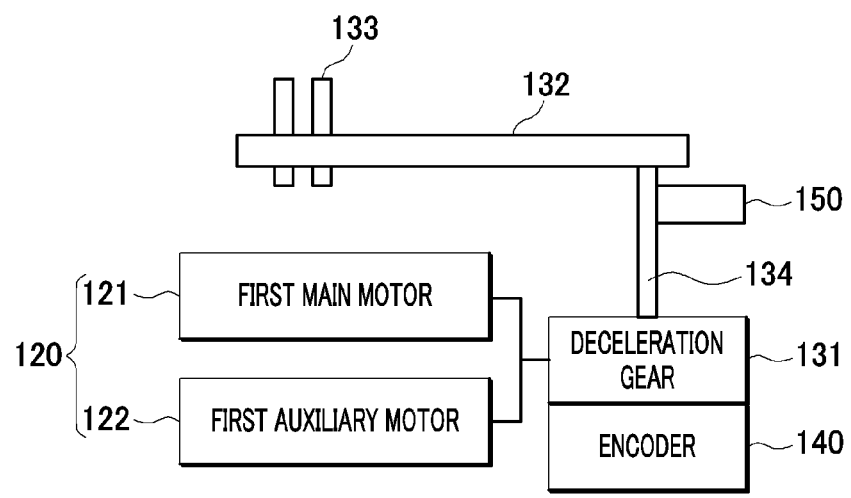
FIGS. 3A and 3B are diagrams illustrating a wiper drive unit according to an embodiment of the present disclosure.
Figure 3B:
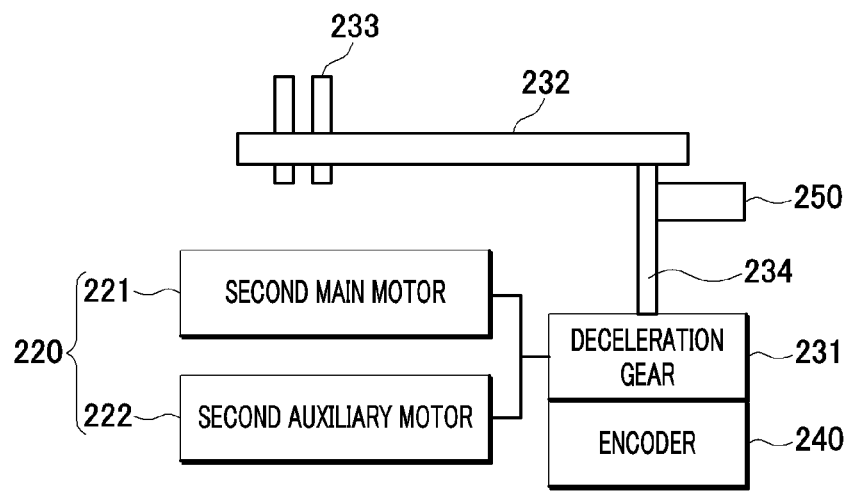
Figure 4:
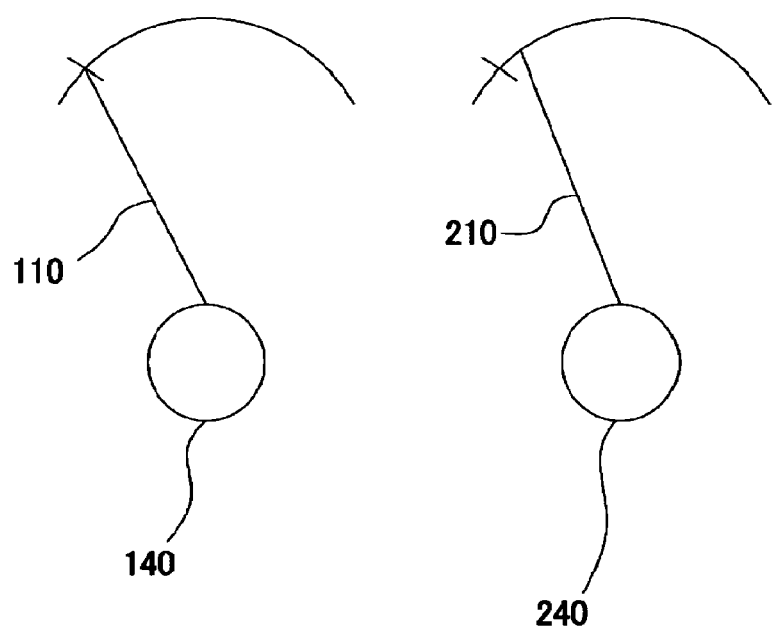
FIG. 4 is a view illustrating a drive principle of the wiper system for a railway vehicle according to an embodiment of the present disclosure.
Figure 5:
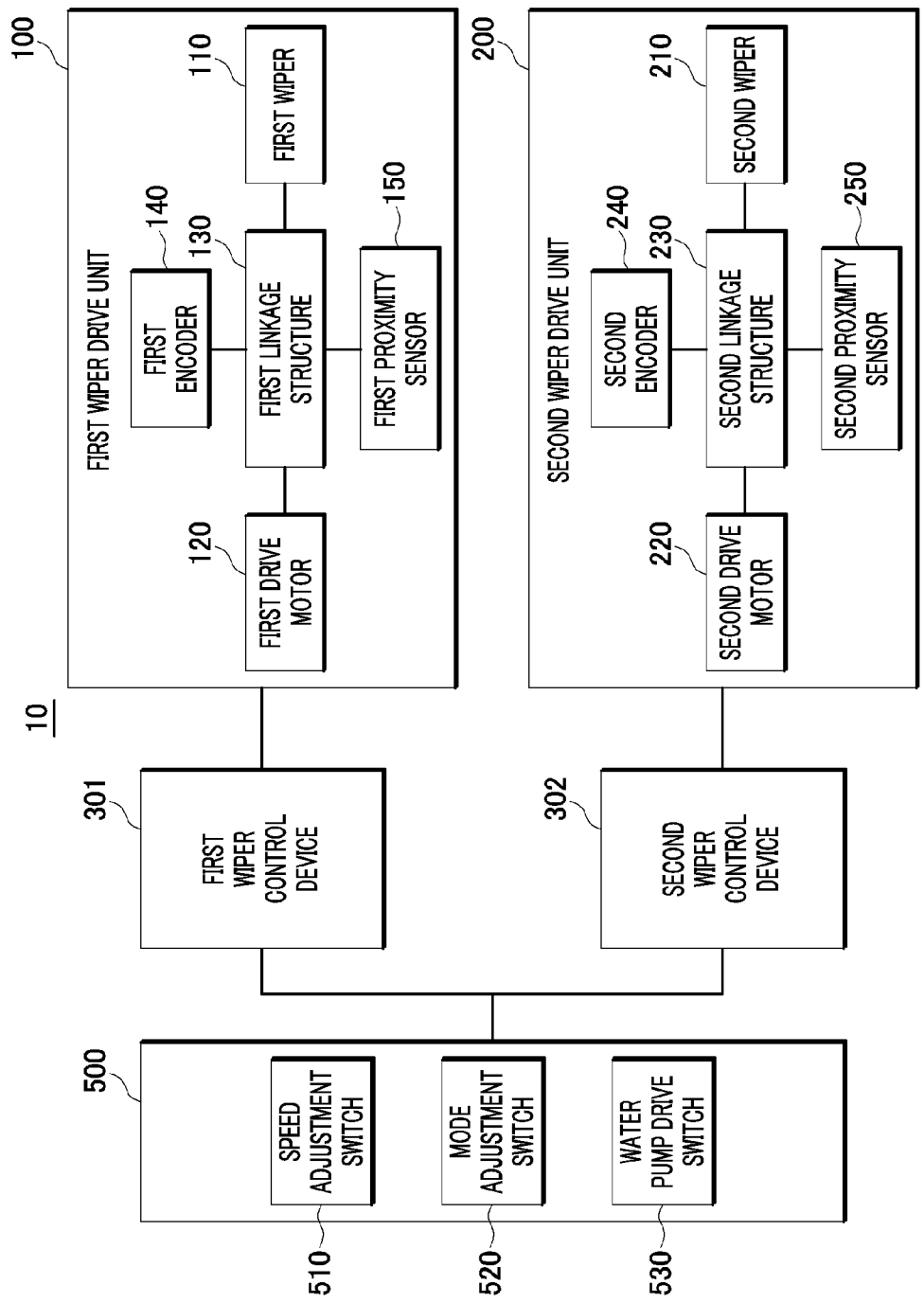
FIG. 5 is a diagram illustrating a wiper system for a railway vehicle according to another embodiment of the present disclosure.
Figure 6:
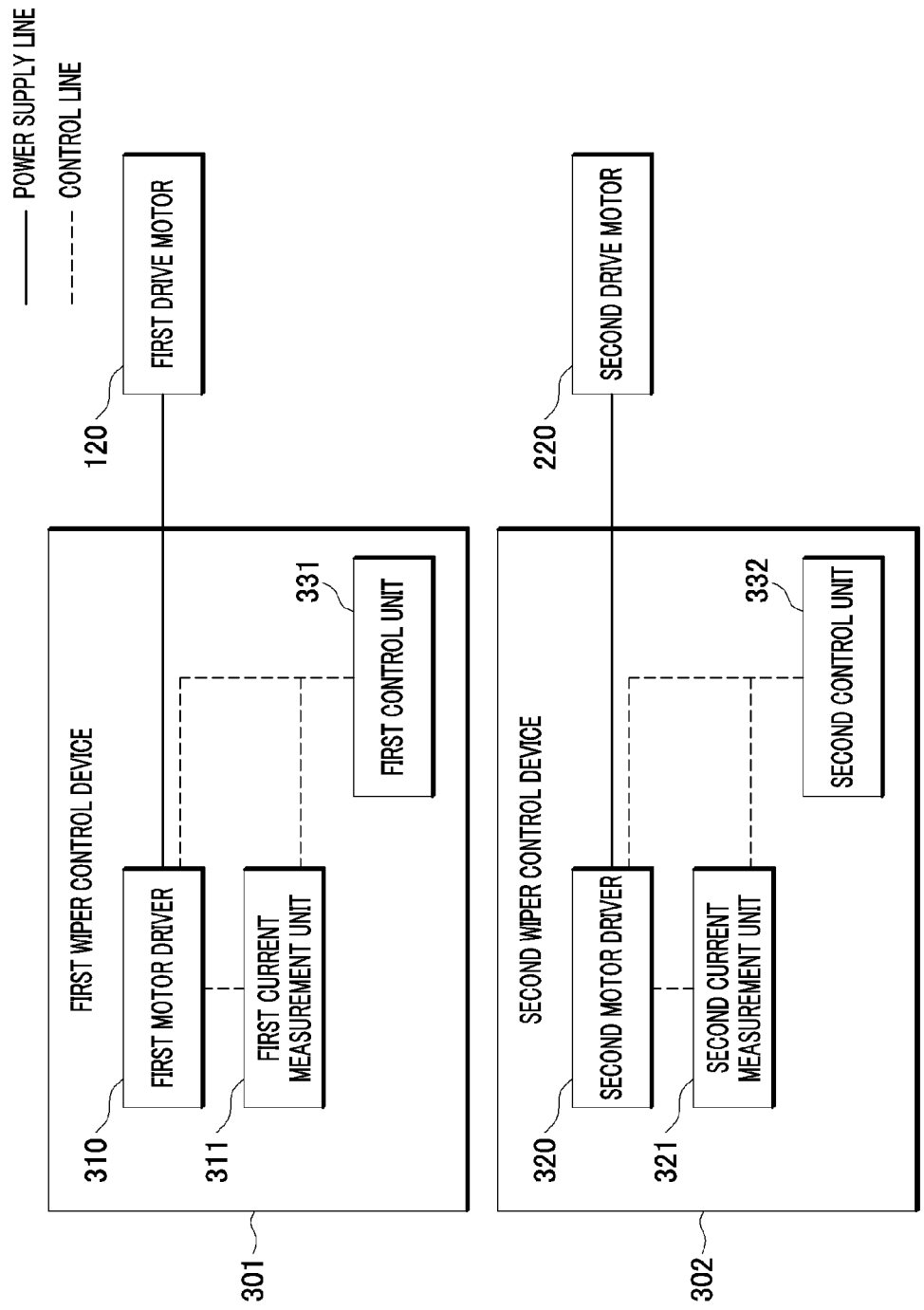
FIG. 6 is a diagram illustrating a first wiper control device and a second wiper control device of a wiper system for a railway vehicle according to another embodiment of the present disclosure.

FIG. 1 is a diagram illustrating a wiper system for a railway vehicle according to an embodiment of the present disclosure, FIG. 2 is a diagram illustrating a wiper control device according to an embodiment of the present disclosure, FIGS. 3A and 3B are diagrams illustrating a wiper drive unit according to an embodiment of the present disclosure, FIG. 4 is a view illustrating a drive principle of the wiper system for a railway vehicle according to an embodiment of the present disclosure, FIG. 5 is a diagram illustrating a wiper system for a railway vehicle according to another embodiment of the present disclosure, and FIG. 6 is a diagram illustrating a first wiper control device and a second wiper control device of a wiper system for a railway vehicle according to another embodiment of the present disclosure.

Referring to FIGS. 1 and 2, an electric dual-mode wiper system 10 for a railway vehicle includes a first wiper drive unit 100, a second wiper drive unit 200, a first current measurement unit 311, a second current measurement unit 321, and a wiper control device 300.

The first wiper drive unit 100 may include a first wiper 110 that is in close contact with an outer surface of glass of a railway vehicle to wipe off foreign matter adhering to the glass, a first drive motor 120 that drives the first wiper 110, a first linkage structure 130 that connects the first drive motor 120 to the first wiper 110, and a first encoder 140 that detects an operation state of the first linkage structure 130.

The first drive motor 120 may rotate when receiving a power supply voltage from an external power supply and may transmit a rotational force to the first wiper 110 through the first linkage structure 130. In this case, the first wiper 110 may perform a reciprocating rotation.

The second wiper drive unit 200 may include a second wiper 210 spaced apart from the first wiper 110 by a predetermined distance, a second drive motor 220 that drives the second wiper 210, a second linkage structure 230 that connects the second drive motor 220 to the second wiper 210, and a second encoder 240 that detects an operation state of the second linkage structure 230.

The second drive motor 220 may rotate when receiving an external power supply voltage and may transmit a rotational force to the second wiper 210 through the second linkage structure 230. In this case, the second wiper 210 may perform a reciprocating rotation.

Referring to FIG. 2, the first drive motor 120 and the second drive motor 220 may be directly connected to the external power supply voltage, and a power supply voltage which is converted by power supply conversion units 340 and 350 for converting the power supply voltage may be applied to a first current measurement unit 311, a second current measurement unit 321, a water pump 410, and a control unit 330 which will be described below.

The wiper control device 300 controls the first wiper drive unit 100 and the second wiper drive unit 200 according to a speed adjustment switching signal, a mode adjustment switching signal, and a water pump drive switching signal that are inputted from a wiper operation unit 500.

Referring to FIG. 2 in more detail, the wiper control device 300 may include a first motor driver 310 that controls the first drive motor 120, a second motor driver 320 that controls the second drive motor 220, and the control unit 330 that controls the first motor driver 310 and the second motor driver 320. For example, the control unit 330 may be a micro controller unit (MCU), and the first motor driver 310 and the second motor driver 320 may include at least one circuit element but are not limited thereto.

The control unit 330 may control driving the first drive motor 120 through the first motor driver 310. In addition, the control unit 330 may control a drive speed of the first drive motor 120 through the first motor driver 310. Specifically, the control unit 330 may calculate (or receive) a target speed value of the first drive motor 120 as the speed adjustment switch 510 provided in a railway vehicle is turned on. The control unit 330 may drive the first drive motor 120 by providing a control power supply voltage to the first drive motor 120 based on the calculated (or received) target speed value.

In addition, the control unit 330 may control driving the second drive motor 220 through the second motor driver 320. In addition, the control unit 330 may control a drive speed of the second drive motor 220 through the second motor driver 320. Specifically, the control unit 330 may calculate (or receive) a target speed value of the second drive motor 220 as the speed adjustment switch 510 provided in the railway vehicle is turned on. The control unit 330 may drive the second drive motor 220 by providing the control power supply voltage to the second drive motor 220 based on the calculated (or received) target speed value.

Meanwhile, as the speed adjustment switch 510 is turned by the wiper operation unit 500, the first wiper 110 and the second wiper 210 may perform a reciprocating rotation at the same rotation speed to have the same angle. However, since positions of the first wiper 110 and the second wiper 210 are different, the first wiper 110 and the second wiper 210 have different loads due to a difference in window shape, a wind pressure, and precipitation, and thus, the first wiper 110 and the second wiper 210 may have different rotation speeds and angles. In this case, the wiper control device 300 may control synchronization operations of the first drive motor 120 and the second drive motor 220 based on information on operation states of the first linkage structure 130 and the second linkage structure 230 transmitted from the first encoder 140 and the second encoder 240, or information of current values of the first drive motor 120 and the second drive motor 220 transmitted from the first current measurement unit 311 and the second current measurement unit 321.

The first current measurement unit 311 measures a current of the first drive motor 120 in real time. In addition, the first current measurement unit 311 may transmit information about the measured current of the first drive motor 120 to the control unit 330.

The second current measurement unit 321 measures a current of the second drive motor 220 in real time. In addition, the second current measurement unit 321 may transmit information on the measured current of the second drive motor 220 to the control unit 330.

Specifically, when foreign matter of birds, insects, or the like adheres to the first wiper 110, a load is applied to the first wiper 110. In this case, a current value of the first drive motor 120 is measured to be greater than or equal to a threshold value by the first current measurement unit 311, and the control unit 330 may switch a rotation direction of the first drive motor 120 to an opposite direction to move the first wiper 110 to an initial position. In addition, when the rotation direction of the first drive motor 120 is switched to the opposite direction and the first wiper 110 is moved to the initial position, the wiper control device 300 may return the first wiper 110 by adjusting a speed of the first wiper 110 in a low-speed step. In other words, when a load increases due to adhering of foreign matter to the first wiper 110, a current value of the first drive motor 120 measured by the first current measurement unit 311 is increased, and when a drive current value of the first drive motor 120 is measured to be greater than a threshold value (for example, a maximum drive current value), it is determined that an overcurrent is generated, and the rotation direction of the first drive motor 120 may be switched to the opposite direction. In this case, a load may occur because the rotation direction of the first drive motor 120 is reversed, and when the rotation direction is switched to the opposite direction, the rotation speed may be reduced to minimize the load.

In this case, the wiper control device 300 reduces a speed of the second wiper 210 such that the time required for one reciprocation when the wipers 110 and 210 are in a normal state is the same as the time required for one reciprocating motion when the wipers 110 and 210 are in an abnormal state, and stops the second wiper 210 for a predetermined time at the initial position, and thereafter, when the first wiper 110 returns to an initial start point, the wiper control device 300 starts to operate the second wiper 210 such that the first wiper 110 and the second wiper 210 have the same rotation angle and speed, and thus, synchronous control may be performed.

In addition, when foreign matter of birds, insects, or the like adheres to the second wiper 210, a load is applied to the second wiper 210. In this case, a current value of the second drive motor 220 is measured to be greater than or equal to the threshold value by the second current measurement unit 321, and the control unit 330 may switch a rotation direction of the second drive motor 220 to an opposite direction to move the second wiper 210 to an initial position.

In addition, when the rotation direction of the second drive motor 220 is switched to the opposite direction and the second wiper 210 is moved to the initial position, the wiper control device 300 may return the second wiper 210 by adjusting a speed of the second wiper 110 in a low-speed step. Specifically, when a load increases due to adhering of foreign matter to the second wiper 210, a current value of the second drive motor 220 measured by the second current measurement unit 321 is increased, and when a drive current value of the second drive motor 220 is measured to be greater than a threshold value (for example, a maximum drive current value), it is determined that an overcurrent is generated, and the rotation direction of the second drive motor 220 may be switched to the opposite direction. In this case, a load may occur because the rotation direction of the second drive motor 220 is reversed, and when the rotation direction is switched to the opposite direction, the rotation speed may be reduced to minimize the load.

In this case, the wiper control device 300 reduces a speed of the first wiper 110 such that the time required for one reciprocation when the wipers 110 and 210 are in a normal state is the same as the time required for one reciprocation when the wipers 110 and 210 are in an abnormal state, and stops the first wiper 110 for a predetermined time at the initial position, and thereafter, when the second wiper 210 returns to an initial start point, the wiper control device 300 starts to operate the first wiper 110 such that the first wiper 110 and the second wiper 210 have the same rotation angle and speed, and thus, synchronous control may be performed.

For reference, the control unit 330 may control drive speeds of the first drive motor 120 and the second drive motor 220 by supplying a pulse width modulation control signal to the first drive motor 120 and the second drive motor 220.

Referring to FIGS. 3A and 3B, the first linkage structure 130 may include a first deceleration gear 131 that is connected to the first drive motor 120 to change a direction of a rotational force of the first drive motor 120 and transmit the rotational force, and a four-section link 132 that transmits the rotational force of the first deceleration gear 131 to a first wiper connection rotation shaft 133. In this case, the first encoder 140 may be connected to the first deceleration gear 131 to detect a rotation state of the first deceleration gear 131, and according to this, the control unit 330 may manage a position and speed information of the first wiper 110 based on information transmitted from the first encoder 140.

In addition, the second linkage structure 230 may include a second deceleration gear 231 that is connected to the second drive motor 220 to change a direction of a rotational force of the second drive motor 220 and transmit the rotational force, and a four-section link 232 that transmits the rotational force of the second deceleration gear 231 to a second wiper connection rotation shaft 233. In this case, the second encoder 240 may be connected to the second deceleration gear 231 to detect a rotation state of the second deceleration gear 231, and according to this, the control unit 330 may manage a position and speed information of the second wiper 210 based on information transmitted from the second encoder 240.

In other words, the control unit 330 may synchronously control the first drive motor 120 and the second drive motor 220 such that the first wiper 110 and the second wiper 210 have the same rotation speed and rotation angle, based on the rotation speed information and the rotation angle information of the first wiper 110 and the second wiper 210 transmitted from the first encoder 140 and the second encoder 240.

Specifically, in a state in which the first wiper 110 is in operation and the second wiper 210 is in a stopped state, in a case in which a drive command for the second wiper 210 is inputted, when the first wiper 110 returns to an initial start point, the second wiper 210 also starts to operate to cause a synchronous control to be performed such that the two wipers have the same rotation angle.

In addition, even when the first wiper 110 and the second wiper 210 have the same rotation angle, the first wiper 110 and the second wiper 210 have different loads over time, and thereby, a difference occurs in rotation speeds of the wiper 110 and the second wiper 210. In order to remove the difference, referring to FIG. 4, rotation angles of the first wiper 110 and the second wiper 210 are measured by the first encoder 140 and the second encoder 240, and during one reciprocation, a speed of one of the first and second wipers 110 and 120 arriving at a point $\frac{1}{10}$ from an initial start point is adjusted in proportion to a speed of the other wiper arriving there later such that the first and second wipers 110 and 120 arrive at the initial start point at the same time. The above-described one reciprocation means that a wiper starts to operate from an initial start point and returns to the initial start point. For example, the control unit 330 may adjust a speed of a wiper by adjusting a power supply voltage supplied to a drive motor. In other words, when the power supply voltage supplied to the first drive motor 120 is reduced, the drive speed of the first drive motor 120 may be reduced, and when the power supply voltage supplied to the second drive motor 220 is reduced, the drive speed of the second drive motor 220 may be reduced.

In addition, the first wiper drive unit 100 may further include a first proximity sensor 150 for sensing a position of the first wiper 110, and the second wiper drive unit 200 may further include a second proximity sensor 250 for sensing a position of the second wiper 210. For example, the first proximity sensor 150 may sense a nearest state of a marker arranged on an output shaft 134 of the first deceleration gear 131 to manage position information of the first wiper 110. In addition, the second proximity sensor 250 may sense a nearest state of a marker arranged on an output shaft 234 of the second deceleration gear 231 to manage position information of the second wiper 210. For example, the markers may protrude outward from the output shafts but are not limited thereto.

When abnormality occurs in the operations of the first encoder 140 and the second encoder 240, the electric dual-mode wiper system 10 may measure the rotation speeds of the first wiper 110 and the second wiper 210 through the first proximity sensor 150 and the second proximity sensor 250 and may synchronously control the first drive motor 120 and the second drive motor 220 based on the rotation speeds. In other words, the first and second encoders 140 and 240 and the first and second proximity sensors 150 and 250 have the same function, that is, a function to measure rotation speeds and rotation angles of the first and second wipers 110 and 210, and have a complementary configuration that may be complemented, when one component thereof is damaged or fails.

In addition, the first drive motor 120 may include a first main motor 121 and a first auxiliary motor 122. In this case, the first wiper 110 is driven by the first main motor 121, and when the first main motor 121 is in an inoperable state due to a failure, the first auxiliary motor 122 is operated to operate the first wiper 110. For example, the first main motor 121 and the first auxiliary motor 122 may be connected to the first deceleration gear 131 through a bevel gear.

In addition, the second drive motor 220 may include a second main motor 221 and a second auxiliary motor 222. In this case, the second wiper 210 is driven by the second main motor 221, and when the second main motor 221 is in an inoperable state due to a failure, the second auxiliary motor 222 is operated to operate the second wiper 210. For example, the second main motor 221 and the second auxiliary motor 222 may be connected to the second deceleration gear 231 through a bevel gear. However, the present disclosure is not limited thereto, and the first drive motor 120 may also be configured to include the first and second main motors 121 and 122, and the second drive motor 220 may also be configured with one motor.

Referring to FIG. 2, the electric dual-mode wiper system 10 may include a first washer liquid spraying module (not illustrated) that is coupled to the first wiper 110 and sprays a washer liquid, a second washer liquid spraying module (not illustrated) that is coupled to the second wiper 210 and sprays a washer liquid, a water pump 410 that supplies a washer liquid to the first washer liquid spraying module and the second washer liquid spraying module, and a washer liquid tank 420 filled with a washer liquid to be supplied to the water pump 410. In other words, the water pump 410 operates according to a water pump drive switch 530 to be described below to make the washer liquid filled in the washer liquid tank 420 be supplied to the first washer liquid spraying module and the second washer liquid spraying module, and thereby, the washer liquid may be sprayed onto a window of a railway vehicle.

In addition, referring to FIG. 1, the electric dual-mode wiper system 10 may further include a wiper operation unit 500 connected to the wiper control device 300. In addition, the wiper operation unit 500 may include a speed adjustment switch 510 for adjusting speeds of the first wiper 110 and the second wiper 210, a mode adjustment switch 520 for adjusting drive modes of the first wiper 110 and the second wiper 210, and a water pump drive switch 530 for adjusting whether or not to drive the water pump 410. For example, when a user continuously presses the water pump drive switch 530, a washer liquid may be sprayed and the first and second wipers 110 and 210 may operate, and after the water pump drive switch 530 is pressed, the washer liquid may be sprayed and the first and second wipers 110 and 210 may stop after a reciprocating operation is performed three times.

As the user adjusts the speed adjustment switch 510, the speeds of the first and second wipers 110 and 210 may be adjusted to increase or decrease step by step. In addition, when foreign materials adhering to the first wiper 110 or the second wiper 210, the first drive motor 120 or the second drive motor 220 may rotate in a reverse direction to return the first and second wipers 110 and 120 to initial positions thereof based on information on a rotation speed or a rotation angle of the first wiper 110 or the second wiper 210 measured in real time by the first encoder 140 or the second encoder 240, and may operate again.

When the first wiper 110 and the second wiper 210 are used as a main wiper and an auxiliary wiper, the mode adjustment switch 520 may be adjusted to selectively operate the first wiper 110 and the second wiper 210. For example, in a case in which the first wiper 110 is used as a main wiper and the second wiper 210 is used as an auxiliary wiper, when a failure occurs in the main wiper, the mode adjustment switch 520 may be positioned as the auxiliary wiper to operate the auxiliary wiper.

Referring to FIG. 2, the wiper control device 300 may further include a first power supply conversion unit 340 and a second power supply conversion unit 350 that convert an external power supply voltage. For example, the first power supply conversion unit 340 and the second power supply conversion unit 350 may convert the external power supply voltage to 25 volts but are not limited thereto. In addition, the power supply voltage converted by the first power supply conversion unit 340 or the second power supply conversion unit 350 may be supplied to the control unit 330 and the water pump 410, and the external power supply voltage may be supplied to the first drive motor 120 and the second drive motor 220 without passing through the power supply conversion units 340 and 350.

The electric dual-mode wiper system 10 includes two power supply conversion units, and when one power supply conversion unit fails, the power supply voltage may be continuously supplied through the other power supply conversion unit, and thereby, the wiper control device 300 may operate. For example, when the first power supply conversion unit 340 is in an abnormal state, the external power supply voltage may be converted by the second power supply conversion unit 350 to be supplied.

Hereinafter, an electric dual-mode wiper system 10 for a railway vehicle according to another embodiment of the present disclosure will be described with reference to FIGS. 5 and 6.

The electric dual-mode wiper system 10 for a railway vehicle according to another embodiment of the present disclosure may include a first wiper control device 301 that controls a first wiper drive unit 100, and a second wiper control device 302 that controls a second wiper drive unit 200.

In detail, the first wiper control device 301 may include a first motor driver 310 that controls a first drive motor 120, and a first control unit 331 that controls the first motor driver 310. In addition, the second wiper control device 302 may include a second motor driver 320 that controls a second drive motor 220, and a second control unit 332 that controls the second motor driver 320.

The first control unit 331 may control a drive and a drive speed of the first drive motor 120 through the first motor driver 310. Specifically, the first control unit 331 may calculate (or receive) a target speed value of the first drive motor 120 as the speed adjustment switch 510 provided in a railway vehicle is turned on. The first control unit 331 may drive the first drive motor 120 by providing a control power supply voltage to the first drive motor 120 based on the calculated (or received) target speed value.

In addition, the second control unit 332 may control a drive and a drive speed of the second drive motor 220 through the second motor driver 320. Specifically, the second control unit 332 may calculate (or receive) a target speed value of the second drive motor 220 as the speed adjustment switch 510 provided in a railway vehicle is turned on. The second control unit 332 may drive the second drive motor 220 by providing a control power supply voltage to the second drive motor 220 based on the calculated (or received) target speed value.

In addition, the first wiper control device 301 and the second wiper control device 302 may all perform a closed loop feedback control.

Specifically, the first wiper control device 301 may provide information on an operation state of the first linkage structure 130 which is transmitted from the first encoder 140 or the first proximity sensor 150 to the second wiper control device 302, and the second wiper control device 302 may provide information on an operation state of the second linkage structure 230 which is transmitted from the second encoder 240 or the second proximity sensor 250 to the first wiper control device 301.

In addition, the first wiper control device 301 may control the first drive motor 120 based on information transmitted from the second wiper control device 302, and the second wiper control device 302 may control the second drive motor 220 based on information transmitted from the first wiper control device 301. In addition, when the first wiper 110 is used as a main wiper and the second wiper 210 is used as an auxiliary wiper, even if the first wiper control device 301 for controlling the first wiper 110 fails, the second wiper 210 which is an auxiliary wiper is driven through the second wiper control device 302, and thus, there is an effect that stability is further increased. In addition, each of the first wiper control device 301 and the second wiper control device 302 is not configured to control only one wiper, and when one of the first and second wiper control device 301 and 302 fails, the other of the first and second wiper control devices 301 and 302 may also drive both the first and second wipers 110 and 120.

Further, an embodiment of the present disclosure may be implemented in the form of a recording medium including instructions executable by a computer, such as a program module executed by a computer. Computer-readable media may be any available media that can be accessed by a computer, and includes both volatile and nonvolatile media, removable and non-removable media.

In addition, computer-readable media may include both computer storage media and communication media. The computer storage media includes both volatile and nonvolatile media, and removable and non-removable media implemented with any method or technology for storing information such as computer readable commands, data structures, program modules or other data. The communication media typically includes computer readable commands, data structures, program modules, other data of a modulated data signal such as a carrier wave, or other transmission mechanisms, and includes any information transmission media.

The foregoing description of the present application is for illustrative purposes only, and those skilled in the art to which the present application belongs will be able to understand that the present application may be easily modified to other specific forms without changing the technical idea or essential features of the present application. Therefore, it should be understood that the embodiments described above are illustrative in all respects and not limited thereto. For example, each configuration element described as an integrated form may be implemented in a distributed form, and likewise, configuration elements described as being distributed may also be implemented in a combined form.

The scope of the present application is indicated by claims to be described below rather than the detailed description, and all changes or modified forms derived from the meaning and scope of the claims and their equivalent concepts should be interpreted as being included in the scope of the present application.

| Explanation of Code | |
|---|---|
| 10: electric dual-mode wiper system for a railway vehicle | |
| 100: first wiper drive unit | |
| 110: first wiper | 120: first drive motor |
| 121: first main motor | 122: first auxiliary motor |

-continued

| Explanation of Code | |
|---|---|
| 130: first linkage structure | 131: first deceleration gear |
| 132: four-section link | 133: first wiper connection rotation shaft |
| 134: output shaft of first deceleration gear | |
| 140: first encoder | 150: first proximity sensor |
| 200: second wiper drive unit | |
| 210: second wiper | 220: second drive motor |
| 230: second linkage structure | |
| 240: second encoder | 250: second proximity sensor |
| 300: wiper control device | |
| 301: first wiper control device | 302: second wiper control device |
| 310: first motor driver | 311: first current measurement unit |
| 320: second motor driver | 321: second current measurement unit |
| 330: control unit | |
| 331: first control unit | 332: second control unit |
| 340: first power supply conversion unit | 350: second power supply conversion unit |
| 360: water pump driver | |
| 370: first current measurement unit | 380: second current measurement unit |
| 410: water pump | 420: washer liquid tank |
| 500: wiper operation unit | |
| 510: speed adjustment switch | 520: mode adjustment switch |
| 530: water pump drive switch | |

What is claimed is:

1. An electric dual-mode wiper system for a railway vehicle, comprising:
a first wiper drive unit that includes a first wiper, a first main motor and a first auxiliary motor for driving the first wiper, a first linkage structure for connecting the first main motor and the first auxiliary motor to the first wiper, a first proximity sensor for sensing a position of the first wiper, and a first encoder for sensing an operation state of the first linkage structure;
a second wiper drive unit that includes a second wiper arranged to be spaced apart from the first wiper, a second main motor and a second auxiliary motor for driving the second wiper, a second linkage structure for connecting the second main motor and the second auxiliary motor to the second wiper, a second proximity sensor for sensing a position of the second wiper, and a second encoder for sensing an operation state of the second linkage structure;
a first current measurement unit that measures a current of the first main motor or the first auxiliary motor in real time;
a second current measurement unit that measures a current of the second main motor or the second auxiliary motor in real time; and
a wiper control device that controls a synchronization operation of the first main motor, the first auxiliary motor, the second main motor and the second auxiliary motor based on information on the operation states of the first linkage structure and the second linkage structure transmitted from the first encoder and the second encoder,
wherein the wiper control device switches a rotation direction of the first main motor or the first auxiliary motor to an opposite direction and moves the first wiper to an initial position thereof when a current value of the first main motor or the first auxiliary motor measured by the first current measurement unit is greater than or equal to a threshold value, and switches a rotation direction of the second main motor or the second auxiliary motor to an opposite direction and moves the second wiper to an initial position thereof when a current value of the second main motor or the second auxiliary motor measured by the second current measurement unit is greater than or equal to a threshold value,
wherein the control unit synchronously control the first main motor, the first auxiliary motor, the second main motor and the second auxiliary motor in order for the first wiper and the second wiper to have the same rotation speed or the same rotation angle based on information transmitted from the first encoder and the second encoder when the first encoder and the second encoder are in a normal operation, and synchronously control the first main motor, the first auxiliary motor, the second main motor and the second auxiliary motor in order for the first wiper and the second wiper to have the same rotation speed or the same rotation angle based on information transmitted from the first proximity sensor and the second proximity sensor when the first encoder and the second encoder are in an abnormal operation state, and
wherein the first auxiliary motor drives the first wiper when the first main motor is in an abnormal state and the second auxiliary motor drives the second wiper when the second main motor is in an abnormal state.

2. The electric dual-mode wiper system of claim 1, wherein the wiper control device includes:
a first motor driver that controls the first main motor or the first auxiliary motor to be driven in a forward or reverse rotation;
a second motor drive that controls the second main motor or the second auxiliary motor to be driven in a forward or reverse rotation; and
a control unit that controls the first motor driver and the second motor driver.

3. The electric dual-mode wiper system of claim 2, wherein the control unit synchronously control the first main motor, the first auxiliary motor, the second main motor and the second auxiliary motor for the first wiper and the second wiper to have the same rotation speed or the same rotation angle based on information transmitted from the first encoder and the second encoder.

4. The electric dual-mode wiper system of claim 2, wherein the control unit controls the second wiper to be operated when the first wiper returns to an initial start point, in a case in which the first wiper is in operation and the second wiper is in a stopped state.

5. The electric dual-mode wiper system of claim 2, wherein the control unit measures speeds of the first wiper and the second wiper through the first encoder and the second encoder, and adjusts the speed of the first wiper arriving at a point 1/10 from an initial start point in proportion to the speed of the second wiper arriving there later than the first wiper such that the first and second wipers arrive at the initial start point at the same time during one reciprocation.

6. The electric dual-mode wiper system of claim 1, wherein the wiper control device switches the rotation direction of the first main motor or the first auxiliary motor to the opposite direction to move the first wiper to the initial position and adjusts a speed of the first wiper to a low-speed step while the first wiper moves to the initial position, and switches the rotation direction of the second main motor or the second auxiliary motor to the opposite direction to move the second wiper to the initial position and adjusts a speed of the second wiper to a low-speed step while the second wiper moves to the initial position.

7. The electric dual-mode wiper system of claim 1,
wherein the wiper control device adjusts speeds of the first wiper and the second wiper and stop times at the initial positions such that times of the first wiper and the second wiper required for one reciprocation when the first wiper and the second wiper are in a normal state are the same as times of the first wiper and the second wiper required for one reciprocation when the first wiper and the second wiper are in an abnormal state.

8. The electric dual-mode wiper system of claim 1, further comprising:
a first washer liquid spraying module coupled to the first wiper to spray a washer liquid;
a second washer liquid spraying module coupled to the second wiper to spray a washer liquid;
a water pump for supplying a washer liquid to the first and second washer liquid spraying modules; and
a washer liquid tank filled with a washer liquid supplied to the water pump,
wherein the wiper control device further includes a water pump driver for controlling the water pump.

9. The electric dual-mode wiper system of claim 1,
wherein the first linkage structure includes a first deceleration gear that is connected to the first main motor or the first auxiliary motor and changes a direction of a rotational force of the first main motor or the first auxiliary motor and transmit the rotational force, and a four-section link for transmitting a rotational force of the first deceleration gear to a first wiper connection rotation shaft, and
wherein the second linkage structure includes a second deceleration gear that is connected to the second main motor or the second auxiliary motor and changes a direction of a rotational force of the second main motor or the second auxiliary motor and transmits the rotational force, and a four-section link for transmitting a rotational force of the second deceleration gear to a second wiper connection rotation shaft.

10. The electric dual-mode wiper system of claim 1, further comprising:
a wiper operation unit connected to the wiper control device,
wherein the wiper control unit includes:
a speed adjustment switch for adjusting speeds of the first wiper and the second wiper;
a mode adjustment switch for adjusting drive modes of the first wiper and the second wiper; and
a water pump drive switch for adjusting whether or not to drive a water pump.

11. The electric dual-mode wiper system of claim 1,
wherein the wiper control device further includes a first power supply conversion unit and a second power supply conversion unit that convert an external power supply voltage, and converts the external power supply voltage through the second power supply conversion unit and supplies the converted voltage when the first power supply conversion unit is in an abnormal state.

12. The electric dual-mode wiper system of claim 11,
wherein the first main motor, the first auxiliary motor, the second main motor and the second auxiliary motor directly receive the external power supply voltage without passing through the first power supply conversion unit or the second power supply conversion unit.

13. The electric dual-mode wiper system of claim 1,
wherein the wiper control device includes a first wiper control device that controls the first wiper drive unit, and a second wiper control device that controls the second wiper drive unit.

* * * * *